United States Patent [19]

Bradley

[11] 4,061,892

[45] Dec. 6, 1977

[54] INSTRUMENTS AND METHODS FOR MEASURING CHARACTERISTICS OF ONLY A SELECTED PORTION OF A TRANSMISSION CHANNEL

[75] Inventor: Frank R. Bradley, Bronx, N.Y.

[73] Assignee: Bradley Telcom Corp., Leonia, N.J.

[21] Appl. No.: 750,614

[22] Filed: Dec. 15, 1976

[51] Int. Cl.² ............................................. H04B 3/46
[52] U.S. Cl. .......................... 179/175.3 R; 324/57 N
[58] Field of Search ....... 179/175.3 R, 175, 175.31 R, 179/170 E; 324/57 N, 58 A

[56] References Cited

U.S. PATENT DOCUMENTS

| 3,290,451 | 12/1966 | Duimelaar | 179/175.3 R |
| 3,422,222 | 1/1969 | Lord | 179/175.3 R |
| 3,814,868 | 6/1974 | Bradley | 179/175.3 R |

OTHER PUBLICATIONS

"A New Measuring Set for Message Circuit Noise" by Cochran et al., Bell Sys. Tech. Jour., July 1960, pp. 911-925.

Primary Examiner—Douglas W. Olms
Attorney, Agent, or Firm—Gottlieb, Rackman & Reisman

[57] ABSTRACT

There are disclosed instruments and methods for facilitating the measurement of characteristics of only a selected portion of a transmission channel. In my copending application Ser. No. 661,106, an apparatus located at the remote end of a channel of interest amplifies the received disturbance component relative to the received test tone, and forwards the resulting processed signal over a second channel to a test site. In this manner, the disturbance signal received by the test instrument represents the disturbance signal received at the remote end of the channel of interest, the disturbance introduced by the second channel being insignificant relative to the amplified disturbance component. In accordance with the present invention, an apparatus at the test site attenuates the received disturbance relative to the test tone by the same factor that it is amplified at the remote end of the first channel. In this manner, the composite test tone/disturbance signal applied to the test instrument is the same as that received at the remote end of the channel of interest.

20 Claims, 6 Drawing Figures

INSTRUMENTS AND METHODS FOR MEASURING CHARACTERISTICS OF ONLY A SELECTED PORTION OF A TRANSMISSION CHANNEL

This invention relates to the testing of transmission facilities, and more particularly to apparatus and methods for determining the characteristics of only a selected portion of a transmission channel.

One standard technique for testing a telephone transmission channel is to transmit a test tone on the channel and to analyze the impairments relative to the tone in the signal received at the far end. A preferred instrument for operating on the test tone and disturbances at the receiving end of the channel is disclosed in my U.S. Pat. No. 3,814,868, entitled "Telephone Line Characteristic Measuring Instrument" which issued on June 4, 1974, which patent is hereby incorporated by reference. Such an instrument, and competing instruments which are on the market, of necessity are relatively expensive and require trained personnel to operate them.

When testing a communication transmission facility, it is often desired to obtain test results for only a portion of the transmission path. A common situation of this type is the testing of a channel between points A and B, where the test instrument and the personnel for operating it are located at point A. What is done in such a case is to apply the test tone at point A for transmission to point B, and then to re-transmit the received signal from point B back to point A where it can be operated upon, the "loopback" being accomplished typically over a 4-wire connection. Such loopback testing is often used where the test instrument and trained personnel are not available at point B. Unfortunately, however, the disturbances in the received signal which are operated upon by the test instrument at point A are those introduced in both the forward and return paths. Very often it is necessary to determine the characteristics of only one of the paths (i.e., one of the two one-way channels in the overall looped-back channel), and in conventional loopback testing there is no way to isolate the forward-path and return-path disturbances from each other.

There are other situations in which it is also necessary to test only a portion of an overall transmission channel even though the test signal is being transmitted over the entire channel. For example, consider the case in which the channel between points A and B is to be tested, but the test instrument and its operator are located at point C. Most telephone central offices are equipped with test tone generators, and thus it is a simple enough matter to have someone at location A connect a test tone generator to the channel. If a connection is established between points B and C, what will be received at point C for analysis are the test tone and the disturbances introduced by both portions of the channel, i.e., that between points A and B, and that between points B and C. Since there is no way to distinguish between the disturbances introduced by the two individual channels, it may be difficult to determine the nature of any trouble which exists along the channel between points A and B.

In my co-pending application Ser. No. 661,106 filed on Feb. 25, 1976 and entitled "Instruments and Methods For Measuring Characteristics Of Only A Selected Portion of a Transmission Channel", which application is hereby incorporated by reference, said application having issued as U.S. Pat. No. 4,021,625 on May 3, 1977, an apparatus and method are disclosed for facilitating the measurement of the characteristics of only a selected portion of a communication channel. An apparatus is placed in the overall channel at the receive end of that portion to be tested, and a tone generator is placed at the transmit end. In the examples described above, the apparatus of my co-pending application would be placed at point B for operating on the received signal at the far end of the channel portion of interest before it is re-transmitted back to point A (where the test instrument is located at the site of the test tone generator), or transmitted onward to point C (where the test instrument is located at some site other than that of the test tone generator). The apparatus of my co-pending application operates on the received signal at the receive end of the channel segment of interest in such a manner that even after subsequent transmission to the test instrument, the disturbances in the final signal relative to the test tone are due primarily to the distortion introduced in the transmission from point A to point B.

The apparatus is relatively inexpensive. Just as test tone generators are universally available, it is envisioned that the apparatus can be made universally available as a standard part of a telephone facility. This will allow expensive test instruments and trained personnel to be located at relatively few locations comparable to point C in the above example. For an operator at point C to conduct a test of a channel connected between points A and B, all that is required is an instruction to a person at point A to connect a test tone generator to the channel, and an instruction to someone at point B to connect the far end of the channel of interest to the input of the apparatus and the output of the apparatus to another channel connected between points B and C. These connections may, with suitable hardware arrangements, be set up automatically under remote control from the test instrument site.

When a test tone is transmitted along the channel, several kinds of distortion are introduced as described in my above-identified patent. What is received can be thought of as the test tone itself together with "disturbances." Alternatively, the disturbances are referred to as "notched noise," that is, the noise which remains after the test tone is "notched" out from the overall received signal.

The apparatus disclosed in my co-pending application is predicated on the concept of amplifying the notched noise at the remote end of the channel (point B) and then transmitting the amplified notched noise to the test instrument. While additional disturbances are introduced between points B and C, they are small compared with the amplified noise between points A and B. This approach in itself, however, is not sufficient because all that would be received at point C would be noise without the test tone. Several important measurements made by conventional test instruments are dependent upon the phase and amplitude of the disturbance component relative to the test tone in the received signal, and without the test tone being extended to point C these tests cannot be made.

Therefore, in accordance with the principles disclosed in my co-pending application the apparatus at point B transmits the received tone onward to point C together with the notched noise. But the notched noise is amplified relative to the test tone. The same kind of tone-related disturbances which are introduced between points A and B are introduced between points B and C. But even if the test tone level itself is the same on both parts of the overall channel, because the notched noise at point B is amplified relative to the tone, it is the major factor in the overall noise received at point C and thus for all practical purposes the subsequent tests measure the characteristics of the channel between points A and B. (Similarly, if the notched noise received at point B is not amplified, but the received test tone is attenuated, the resulting tone-related disturbances introduced by the channel between points B and C will be small relative to the notched noise at point B (as received at point C).)

It has been found that a relative amplification factor of two between the notched noise and the test tone received at point B is sometimes adequate, and there is rarely a need to use a relative amplification factor in excess of five. The reason why this is so is that in the usual case the noise components introduced by the two portions of the channel are uncorrelated. The measurements made by typical test instruments are functions of the power of individual disturbance components. In terms of power, the overall notched noise signal received at point C is equal to the square root of the sum of the squares of the two individual notched noise components. If one component is two times greater than the other in magnitude, and the two components are uncorrelated, the relative power contributions of the two components have a ratio of 4:1. It is apparent that a relative amplification factor of only two between the notched noise and the test tone received at point B is sufficient to appreciably "mask out" the disturbances introduced between points B and C, even though the test tone is transmitted onward from point B to point C.

There are several ways to enhance the notched noise recieved at the far end of the channel relative to the received test tone prior to the transmission over another channel to the test instrument. One way is to completely separate the test tone from the notched noise, to amplify the notched noise of to attenuate the test tone, and then to add the two of them together. Another way is to extract the notched noise from the overall received signal, and to add some multiple of it to the overall received signal prior to transmission to the test instrument, or even to duplicate the received test tone and to subtract some fraction of it from the overall signal.

But no matter how the relative amplification or attenuation is accomplished, it is important that the isolation of the test tone or the notched noise from the composite signal be highly selective. For example, if the test tone is to be eliminated from the composite signal so that all that remains is the notched noise (which subsequently may be amplified and then added to the composite signal), what should be filtered out of the composite signal should be only a very narrow band of frequencies around the test tone, for example 5–10 Hz. Otherwise, the notched noise signal itself will be changed by the apparatus at point B. In this regard, the techniques described in my above-identified patent can be utilized to great advantage for they allow what are in effect very narrow filters to be constructed, as will become apparent below. If a conventional fixed-frequency notched filter is used to separate the test tone from the disturbances, not only is the characteristic exhibited by such a filter relatively wide, but the filter tends to distort phase relationships between the disturbances and the tone, and it also tends to attenuate some of the disturbance components which are close in frequency to the test tone. It is for this reason that my aforesaid techniques — which are more accurately described as involving subtraction, rather than filtering — are preferred because they allow very narrow non-distorting notches of only a few Hz bandwidth to be provided.

In the several systems disclosed in my co-pending application, the signal received at the test instrument site consists of the original test tone (attenuated by the amplitude characteristic at the test tone frequency) plus a noise component. The noise component of two parts — the disturbance received at the remote location multiplied by a predetermined amplification factor, plus the disturbance introduced during the transmission from the remote location to the test instrument. Both noise components are affected by the gain characteristic of the channel from the remote location to the test instrument site. In the usual case, the gain characteristic does not effect the validity of the measurements and it can be ignored. Because the disturbance component received at the remote location is amplified prior to its transmission to the test instrument site, this disturbance component is significantly greater than the additional disturbance introduced during the second leg of the overall transmission. For all intents and purposes, the disturbance received at the test instrument site is the disturbance received at the remote location multiplied by the pre-determined amplification factor. If the test tone level and the disturbance level are compared at the test instruments site, with the disturbance level being reduced by a factor equal to the inverse of the predetermined gain introduced at the remote location, the relative magnitudes of the two original signal components can be determined. Unfortunately, it has been found that operators in the field sometimes object to having to perform the manual step of dividing the disturbance level by the predetermined amplification factor in order to arrive at the true relative levels of the test tone and the disturbance components. Also, for large impairments, the amplified disturbance signal may cause saturation or off-scale readings in the test instrument.

It is a general object of my present invention to provide an additional instrument for use at the test instrument site for automatically reducing the disturbance component relative to the tone component by the inverse of the predetermined amplification factor introduced at the remote location, so that the resulting test tone and disturbance components at the input of the test instruments have the same relative levels as those received at the remote location.

The apparatus of the present invention must also function to isolate the test tone and the notched noise in the composite signal on a highly selective basis. This is necessary in order that only the level of the disturbance be reduced in the composite signal (or, conversely, that the level of the test tone be increased by the same factor). In accordance with the principles of my present invention, this can be accomplished quite readily. In the several systems disclosed in my co-pending application, an amplifier is provided whose gain is K (or K−1). In each case, the signal transmitted from the remote location is the same as that received except that the disturbance component is increased relative to the test tone component by a factor of K. (The fact that in some of the systems disclosed, the amplifier has a gain of K−1 is of no moment; these systems are designed such that the overall gain factor is still K.) In accordance with the principles of my present invention, each of the systems disclosed in my aforesaid application can be utilized to accomplish the converse objective simply by changing the amplifier gain from K to 1/K or from (K−1) to ([1/K]−1).

Further objects, features and advantages of my invention will become apparent upon consideration of the following detailed description in conjunction with the drawing, in which.

Figure 1:
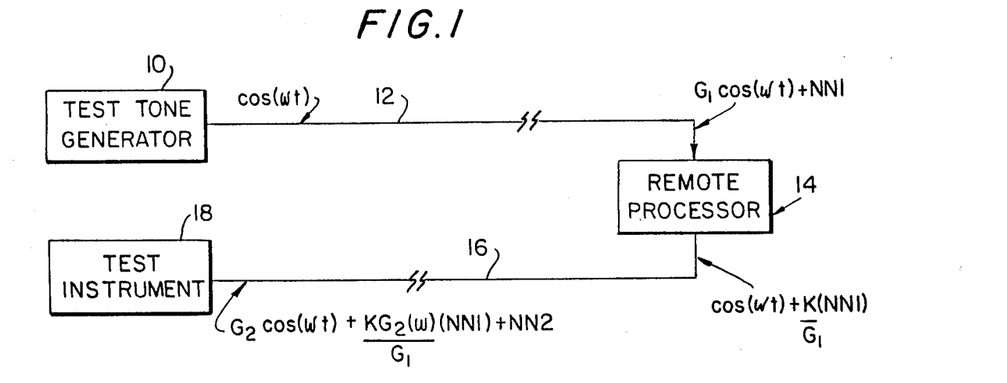
FIG. 1 is the same as FIG. 1 in my co-pending application and depicts a typical test set-up in which the apparatus of my co-pending application is employed.

FIG. 1 discloses use of a "remote processor" in accordance with the principles of the invention disclosed in my co-pending application. A test tone generator 10 is connected to one end of transmission channel 12, it being this transmission channel whose characteristics are to be measured. The test tone generator (at point A in the examples above) applies a pure tone of the form cos(wt) to the channel. At the far end (point B in the examples above), the received signal is of the form $G_1\cos(wt)+NN1$. The term $G_1$ is the factor by which the test tone is attenuated as it transmitted along the channel of interest. The term NN1 represents all of the disturbances introduced by the channel on the test tone. The apparatus 14 of my co-pending application is placed at the far end of the channel. As shown in FIG. 1, the apparatus is referred to as a "remote processor" because it is placed at the remote end of the channel and it processes the received signal. The apparatus generates at its output a signal having two components as shown in FIG. 1. The first component is simply a replica of the test tone, cos(wt). The second component is the notched noise NN1, multiplied by a factor $(K/G_1)$. Typically, the ratio of the noise level to the test tone level at the output of the apparatus is 2-5 times greater than the ratio at the input of the processor. (The upper limit is determined by test instrument measurements; the test instrument must not saturate.)

The processed signal is then transmitted over channel 16 to a test instrument 18, the test instrument being that disclosed in my above-identified patent or any of many other commercially available instruments. (The test instrument is located at point C in the examples described above, although point C can be the same as point A if, for example, channels 12 and 16 comprise a 4-wire duplex channel.) The test tone component is attenuated by a factor $G_2$. The notched noise component $(K/G_1)(NN1)$ is attenuated by a factor $G_2(w)$. The attenuation of the notched noise signal component is a function of frequency since different frequencies are attenuated to different degrees in a typical communication channel. The third component, as shown in FIG. 1, in the received signal at the test instrument is NN2, the total disturbance on the test tone introduced by channel 16.

There are two important things to observe about the composite signal operated upon by the test instrument. First, not only is a replica of the original test tone present in the signal, but the ratio of the noise to the tone at the output of remote processor 14 is K times the ratio at the input. This permits the test instrument to determine phase and amplitude information of the notched noise with respect to the tone, as they are received at the input of the remote processor, information which is of great significant especially in data communication. The second point of interest is the factor K by which the term NN1 is multiplied. Even if the levels of NN1 and NN2 are the same, the NN1 components is much larger in the overall received signal because of the amplification introduced by the remote processor. (To the extent that the frequency responses of the two channels are the same, $G_2(w)$ does not affect the measurements. It is therefore preferable that the test tone frequency be mid-band where the frequency responses are both relatively flat.)

Figure 2:
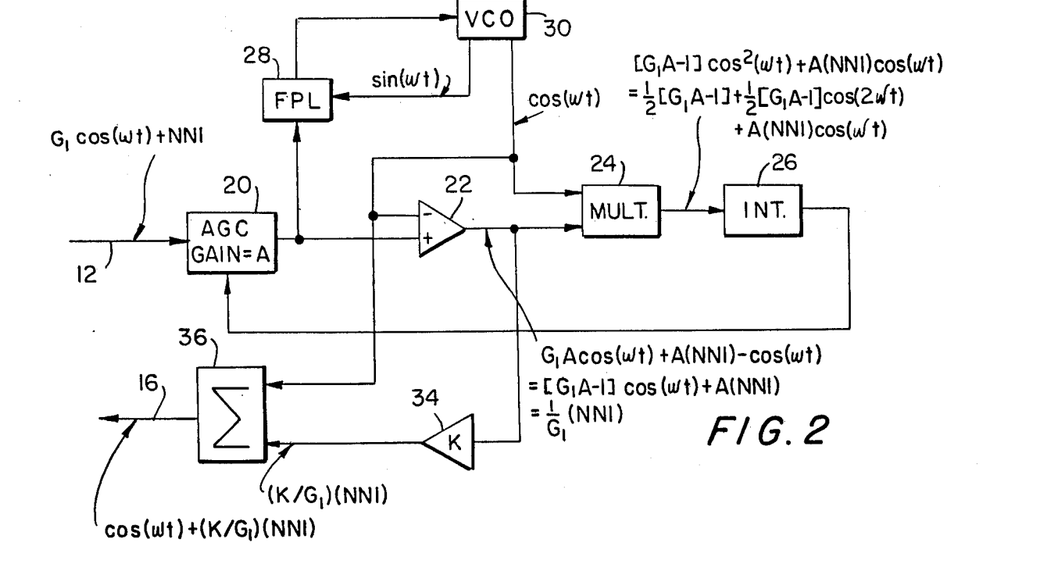
FIG. 2 is the same as FIG. 2 in my co-pending application and depicts a first remote processor for amplifying the received disturbance component relative to the received test tone component.

One form of remote processor is shown in FIG. 2. The apparatus operates on the $G_1\cos(wt)+NN1$ signal at the remote end of channel 12 to generate and apply to channel 16 a signal of the form $\cos(wt)+(K/G_1)(NN1)$. The incoming signal is applied to automatic gain control circuit 20. The gain A of this amplifier varies with the DC level at its control input. The value of the gain will be described below. The output of amplifier 20 is applied to one input of frequency phase lock circuit 28. Voltage controlled oscillator 30 generates two signals sin(wt) and cos(wt). The sine signal is applied to the second input of frequency phase lock circuit 28, and the output of this circuit is applied to the control input of the voltage controlled oscillator. The operation of this type of circuit is well known to those skilled in the art. Briefly, the frequency phase lock circuit functions to multiply its two inputs. The NN1 components in the output of amplifier 20 are uncorrelated with the sine wave at the output of osciallator 30. Consequently, the product of the two signals averages out to be zero and is stripped out by the low-pass filter at the output of circuit 28 (or the input of circuit 30). The effective output of frequency phase lock circuit 28 controls the voltage controlled oscillator so that the product of the two terms sin(wt) and $G_1\cos(wt)$ has a zero DC component. If the frequencies or phases are different, the output is positive or negative. The output is applied to the control input of the voltage controlled osciallator and varies the frequency and phase of the oscillator in a direction which tends to return the output of circuit 28 towards zero. The frequency phase lock circuit and the voltage controlled oscillator thus comprise a feedback path and function to control the frequency and phase of the generated tone. (Hereinafter, references to a frequency match are to be taken as a match in phase as well.) It is important for the subsequent processing to generate an exact replica of the test tone. (If more than one test tone is to be transmitted, the voltage controlled osciallator must have a wide range of operation. As is known in the art, it is possible to provide circuitry for operating in both acquisition and tracking modes.)

The cos(wt) signal generated by oscillator 30 is applied to the minus input of difference amplifier 22, the output of amplifier 20 being extending to the plus input of the amplifier. The resulting signal at the output of difference amplifier 22 is that shown in FIG. 2, and reduces to $[G_1A-1]\cos(wt)+A(NN1)$.

The output of the difference amplifier is applied to one input of multiplier 24, the $\cos(wt)$ signal from oscillator 30 being applied to the other input. The output of the multiplier is as shown in FIG. 2, each term in the output of difference amplifier 22 being multiplied by $\cos(wt)$. Recalling that $\cos^2(wt)=(\tfrac{1}{2})+(\tfrac{1}{2})\cos(2wt)$, the multiplied output can be rewritten as $(\tfrac{1}{2})[G_1A-1]+(\tfrac{1}{2})[G_1A-1]\cos(2wt)+A(NN1)\cos(wt)$.

This signal is applied to the input of integrator 26. The integrator, typically an operational amplifier with a capacitor in the feedback path, functions as a low-pass filter with high DC gain. The $\cos(wt)$ and $\cos(2wt)$ components in the multiplier output are thus not passed through the integrator; the integrator output is essentially equal to the integral of $(\tfrac{1}{2})$ $[G_1A-1]$, and it is this signal which is applied to the gain control input of amplifier 20. The amplifier gain is varied by the control signal. The overall loop functions to vary the gain A of amplifier 20 such that the DC component of the integrator input tends to be zero. Since this input is $(\tfrac{1}{2})$ $[G_1A-1]$, the effect of the loop is to force $G_1A$ to be equal to unity. Thus, the gain A of amplifier 20 is automatically adjusted to be equal to $1/G_1$. The AGC loop and the phase lock loop operate simultaneously. The output of the phase lock circuit varies with the magnitudes of its two inputs, but the only time that the output is zero is when the frequency of oscillator 30 is the same as that of the test tone. When both loops are nulled, the AGC loop causes the phase lock loop sensitivity to be independent of input signal level.

Referring to FIG. 2 and the equation for the signal at the output of difference amplifier 22, the first term in the reduced expression is zero since $[G_1A-1]$ equals zero. Consequently, the input to amplifier 34 is equal to $(1/G_1)$ (NN1). This signal is multiplied by a fixed factor K in amplifier 34, and the resulting signal is applied to one input of summer 36. The other input to the summer is the $\cos(wt)$ signal. The output applied to channel 16 is thus $\cos(wt)+(K/G_1)$ (NN1), as shown in FIG. 2. If the level of oscillator 30 is the same as that of the test tone generator, the test tone which is transmitted from the remote processor has the same level as that applied to the test tone generator to channel 12, no matter how the test tone is attenuated as a result of its transmission along channel 12. (In and of itself, this is not of paramount importance because the exact level of the test tone applied to channel 16 does not generally affect the test measurements; what is important is that the test tone be present together with the disturbances in the overall received signal, in a ratio increased by the factor K, so that phase and amplitude measurements may be made relative to it.) The significant aspect of the signal applied to channel 16 by the remote processor is that the notched noise component of the signal operated upon by the processor is amplified relative to the received test tone. It is this enhancement of the disturbances relative to the test tone that "masks out" the disturbances on the test tone introduced by the transmission from the remote processor to the test instrument.

There are two distinct functions performed by the circuit of FIG. 2 which require differentiation. One relates to the local generation of a tone whose frequency is identical to that of the tone transmitted down channel 12. It is circuits 28 and 30 which do this. The second function relates to the elimination of the test tone in the received signal from its disturbances. This is accomplished by difference amplifier 22, together with automatic gain control circuit 20, and elements 24 and 26 which derive the feedback signal. The difference amplifier can subtract the test tone from the composite signal only after the locally-generated tone and the test tone component in the composite signal have the same magnitude, and equal magnitudes are controlled by the automatic gain control circuit. It is by subtracting the correct-magnitude tone from the composite received signal that the NN1 component can be isolated for subsequent amplification. Instead of using a notched fixed-frequency filter to eliminate the test tone from the composite signal, a subtraction operation is performed because a conventional fixed-frequency filter, in addition to eliminating the test tone from the composite signal, will also affect the relative phases of the disturbances and test tone.

In my co-pending application several other embodiments are shown for accomplishing the same objective. Of these several embodiments, that of FIG. 4 (FIG. 3 in the present application) entails a slightly different approach in that it uses a "tracking filter." Only this apparatus is disclosed in the present application. (Modifications of the other systems for accomplishing the converse objective will be apparent to those skilled in the art.)

For the reasons described above, fixed-frequency filters are not the preferred way to separate the received test tone and the received disturbances. Instead, the utilization of a subtraction technique is far more effective in eliminating the test tone from the composite signal without at the same time modifying the disturbances. The subtraction technique can be thought of as involving the use of a "tracking filter," the circuit of FIG. 2 in such a case reducing to the equivalent circuit of FIG. 3. Tracking filter 40 in FIG. 3 has a center frequency which tracks the main input frequency. The tracking filter generates internally a signal whose amplitude is equal to the main input frequency but which has a phase shift of 180 degrees, this phase-shifted signal then being subtracted from the composite input.

Figure 3:
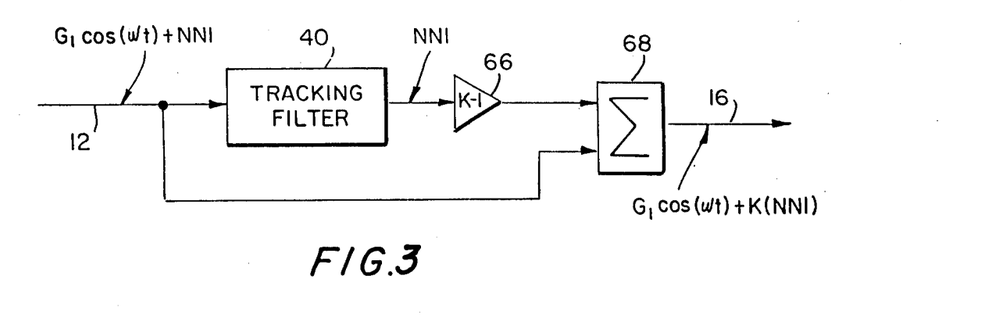
FIG. 3 is the same as FIG. 4 in my co-pending application and depicts a second apparatus for amplifying the disturbance level relative to the test tone level at the remote location.

In the circuit of FIG. 3, the received signal on channel 12 is applied to the input of tracking filter 40. The filter in effect strips the test tone from the composite signal and only the disturbances NN1 appear at its output. The disturbances are multiplied by $(K-1)$ in amplifier 66 and applied to one input of summer 68. The input signal is applied directly to the other input of the summer and the resulting signal applied to channel 16 is of the same form as that generated by the apparatus of FIG. 2. The composite output signal in FIG. 3 is the same as that in FIG. 2 except that it is multiplied by the factor $G_1$. But because it is the relative levels of the two components that are important, the two signals are equivalent to each other.

Figure 4:
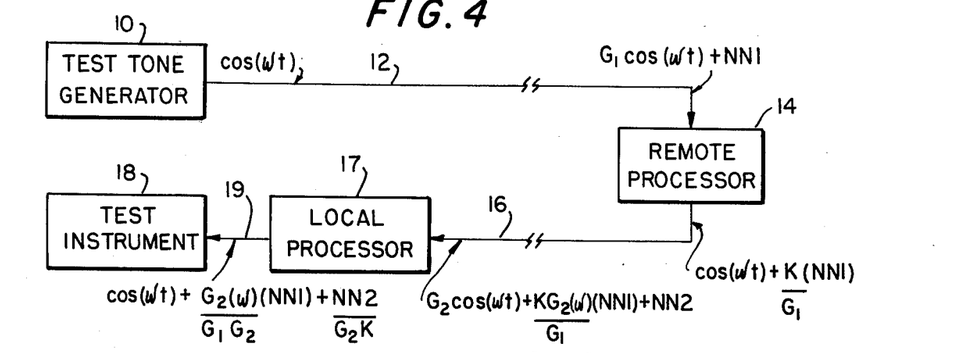
FIG. 4 depicts the system of the present invention which is the same as that of my co-pending application but for the addition of "local processor" 17.

In the overall system of the present invention depicted in FIG. 4, a "local processor" 17 is added between the terminal end of channel 16 and the input of test instrument 18. The signal applied to the local processor is that shown in FIG. 1 as being applied to the test instrument. The function of the local processor is to attenuate the NN1 component relative to the test tone by a factor K. In this way, except for the channel gain terms, the test tone and the NN1 components applied to the test instrument are the same as those received at the remote location over channel 12. It will be recalled that the remote processor in the systems of FIGS. 1 and 4 divides both components by the test tone level $G_1$, and further amplifies the noise component by a factor K. The local processor in FIG. 4 similarly performs two functions. The first is identical to that performed by the remote processor — all components are divided by the level of the test tone component (in this case $G_2$). But the second function is exactly the opposite of that performed by the remote processor. Instead of amplifying the noise component by a factor K, the noise component is attenuated by a factor K. Of course, since the noise component at the test instrument site consists of two components, both of them must be considered. The first noise component received at the input of the local processor is $KG_2(w)(NN1)/G_1$, and when this component is divided by $G_2$ and then divided by K, the resulting signal is $G_2(w) (NN1)/G_1G_2$. The second noise component at the input of the local processor is NN2, and at the output of the local processor this component appears as $(NN2)/G_2K$.

The final signal at the output of the local processor on conductor 19 is shown in FIG. 4. Although $G_2(w)$, $G_1$ and $G_2$, are not all equal to unity, the measurements are not seriously affected by the fact that these factors may be slightly different from unity. In a typical channel, the channel gain at the test tone frequency is approximately unity, and $G_2(w)$ is similarly equal to approximately unity at frequencies around the test tone and throughout most of the center of the voice band. Consequently, to a first approximation, the terms $G_2(w)$, $G_1$ and $G_2$ may be ignored. In such a case, the signal applied to test instrument 18 is of the form $\cos(wt)+(NN1)+(NN2)/K$. The NN2 component can be ignored because it is relatively insignificant compared to the NN1 component, it being the latter component whose measurement is desired. Because the NN1 component is originally amplified by the factor K for the remote processor, and both disturbance components are attenuated by the factor K in the local processor, the NN1 component at the output of the local processor is greater than the NN2 component by the original amplification factor. Consequently, the signal at the input of test instrument 18 reduces to approximately $\cos(wt)+(NN1)$, and this signal consists of nothing more than the test tone and the disturbance component as received at the remote site. The test instrument can then be used to operate on the input signal as though it were located at the remote site for the purpose of establishing the level of the disturbance component relative to the test tone, without the operator being required to manually divide the disturbance level by the factor K introduced prior to transmission of the composite signal from the remote site to the test site.

Figure 5:
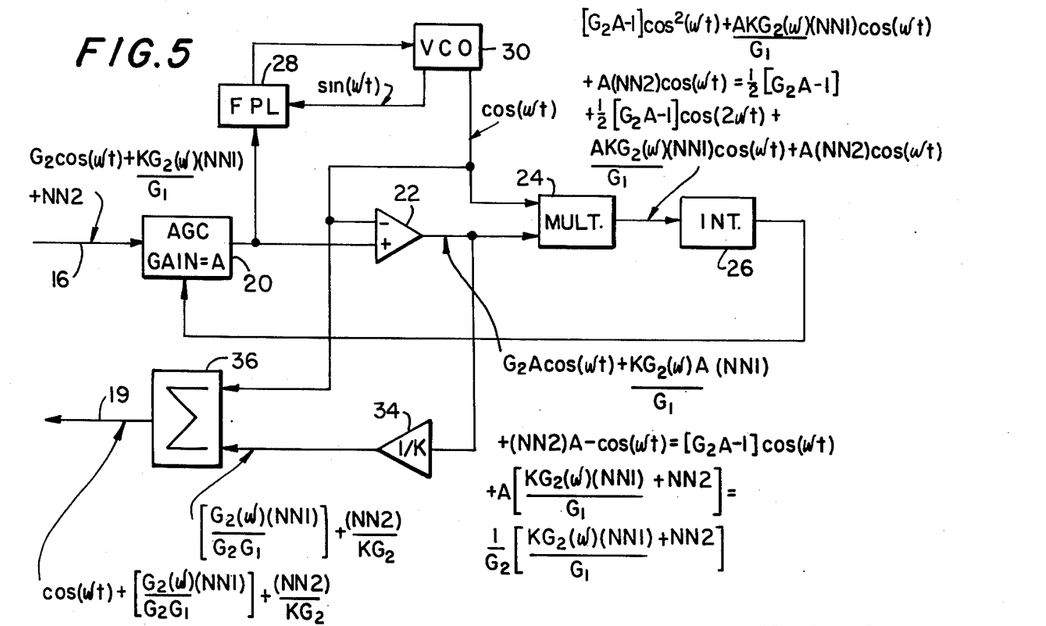
FIG. 5 depicts a first illustrative embodiment of a "local" processor in accordance with the principles of the present invention, the system being based on the apparatus of FIG. 2.

FIG. 5 depicts a first illustrative embodiment of the local processor 17. This figure should be compared with FIG. 2. The input to the local processor is on conductor 16 and the output is on conductor 19. The input signal, of course, is no longer the signal on channel 12 at the remote site, but rather the signal on channel 16 at the input to the local processor in FIG. 4. The only difference between the systems of FIG. 2 and FIG. 5 is that amplifier 34 in FIG. 5 has a gain of 1/K rather than a gain of K as in FIG. 2. This is the only change necessary in order to isolate the test tone and disturbance components from each other, and to attenuate the disturbance component by a factor K relative to the test tone component.

In FIG. 5, the signals at the outputs of the various blocks are shown in a form similar to that shown in FIG. 2. The output of difference amplifier 22 is simply the signal on conductor 16 multiplied by the gain A of automatic gain control circuit 20, from which is subtracted the locally generated $\cos(wt)$ test tone. (Although it might be thought that instead of providing elements 28 and 30 to generate the $\cos(wt)$ signal this signal could be derived from test tone generator 10 itself in FIG. 5, such is not the case. Due to the phase shift along channels 12 and 16, elements 28 and 30 are still required in order to insure that the $\cos(wt)$ signal used in the apparatus of FIG. 5 is in phase with the received test tone component.) The signal at the output of difference amplifier 22 is multiplied by the $\cos(wt)$ signal generated by the apparatus, and the signal at the output of multiplier 24 is shown in the drawing. Once again, the feedback loop functions to cause the term $G_2A-1$ to be 0. With $A=1/G_2$ substituted in the equation shown for the signal at the output of difference amplifier 22, the signal at the input of amplifier 34 reduces to $[1/G_2][(KG_2(w) (NN1)/G_1)+(NN2)]$ as shown in FIG. 5. After amplification by a factor 1/K, this signal, when added to $\cos(wt)$, results in a composite signal on conductor 19, which is the same as that shown in FIG. 4 and described above. The theory of operation of the apparatus of FIG. 5 is the same as that of the apparatus of FIG. 2. The only difference is that amplifier 34 in FIG. 5 has a gain of 1/K rather than K. This single change is all that is required to isolate the test tone and disturbance components from each other, to reduce the level of the disturbance component by a factor K, and to then recombine the signals so that the composite signal at the output of the local processor (when disregarding the NN2 signal and the various gain factors) is the same as the signal received over channel 12 at the remote site.

Figure 6:
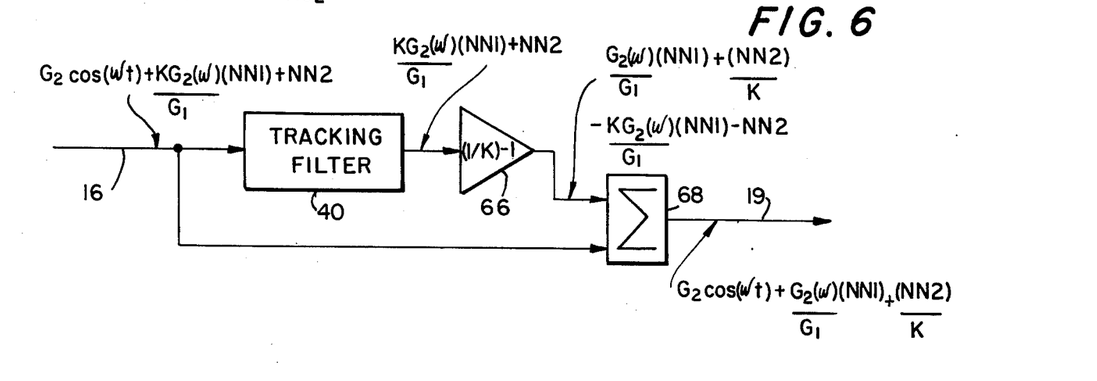
FIG. 6 depicts a second illustrative embodiment of a "local processor" in accordance with the principles of the present invention, with the local processor being based on the apparatus of FIG. 3.

The embodiment of the invention shown in FIG. 6 is identical to the apparatus of FIG. 4 except that amplifier 66, instead of having a gain equal to $(K-1)$, has a gain of $([1/K]-1)$ and functions as an attenuator and inverter, i.e., it has a negative gain whose magnitude is less than unity. With an input signal of the form shown applied to conductor 16 in FIG. 6, and recalling that tracking filter 40 simply eliminates the $\cos(wt)$ term, the various signals on the several conductors are derived simply by multiplying by the gain of amplifier 66 or adding together the two inputs of summer 68. The output signal on conductor 19 is of a form similar to that shown in FIG. 4, except that the entire signal is multiplied by a factor $G_2$. Once again, since it is the relative levels of the several components that is of importance, this difference is of no concern. Once again, the NN2 component is insignificant relative to the NN1 component because the former is divided by the factor K. And when neglecting the various gain terms, it is apparent that the signal applied to the input of test instrument 18 is of the form $\cos(wt)+(NN1)$, a signal consisting of the received test tone at the remote site together with the disturbance introduced by channel 12.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

What I claim is:

1. Apparatus for processing a signal consisting of test tone and disturbance components received on a channel and for applying the processed signal consisting of tone and disturbance components to a test instrument comprising means for generating a tone whose frequency and phase are the same as those of the received test tone, and means for operating on the received signal and the generated tone for deriving said processed signal in which the ratio of the level of the disturbance component to the level of the tone component is less by a predetermined factor than the ratio of the level of the disturbance component to the level of the test tone component in the received signal, and the relative phases of the tone and disturbance components are the same as those in the received signal.

2. Apparatus in accordance with claim 1 wherein said tone generating means includes an oscillator, and means responsive to the output of said oscillator and the received signal for generating a control signal, said control signal being extended to said oscillator to control its frequency and phase to be equal to those of the test tone in the received signal.

3. Apparatus for processing a signal consisting of test tone and disturbance components received on a channel and for applying the processed signal consisting of tone and disturbance components to a test instrument comprising tracking filter means for operating on the received signal to derive a signal proportional thereto but with the tone component absent, means for attenuating and inverting said derived signal, and means for adding together the attenuated and inverted signal and said received signal.

4. Apparatus for processing a signal consisting of test tone and disturbance components received on a channel and for applying the processed signal consisting of tone and disturbance components to a test instrument comprising means for operating on the received signal to derive a signal proportional thereto but with a tone level reduced relative to the disturbance level, means for attenuating said derived signal, and means for adding to the attenuated derived signal a tone having the same frequency and phase as those of the test tone contained in the received signal.

5. A test system for testing the characteristics of a communication channel of interest comprising a test tone generator connected to one end of said channel; a remote processor having an input connected to the other end of said channel, and an output; a test instrument; a local processor having an output connected to said test instrument, and an input; and another channel connected between said remote processor output and said local processor input; said remote processor including means for generating a tone whose frequency and phase are the same as those of the test tone received at said respective input, and means for operating on the test tone/disturbance signal received at said respective input and the generated tone for deriving and applying to said respective output a signal in which the ratio of the level of the disturbance component to the level of the tone component is greater by a predetermined factor than the ratio of the level of the disturbance component to the level of the test tone component in the signal received at said respective input, and the relative phases of the tone and disturbance components are the same as those in the respective received signal; said local processor including means for generating a tone whose frequency and phase are the same as those of the test tone received at said respective input, and means for operating on the test tone/disturbance signal received at said respective input and the generated tone for deriving and applying to said respective output a signal in which the ratio of the level of the disturbance component to the level of the tone component is less by said predetermined factor than the ratio of the level of the disturbance component to the level of the test tone component in the signal received at said respective input, and the relative phases of the tone and disturbance components are the same as those in the respective received signal.

6. A test system in accordance with claim 5 wherein the tone generating means in at least one of said remote and local processors includes an oscillator, and means responsive to the output of said oscillator and the signal received at the respective input for generating a control signal, said control signal being extended to said oscillator to control its frequency and phase to be equal to those of the test tone in the signal received at the respective input.

7. A test system in accordance with claim 6 wherein the operating means in at least one of said remote and local processors includes means for amplifying the signal received at the respective input, means for subtracting the generated tone from the amplified signal received at the respective input to derive a difference signal, means responsive to both said difference signal and said generated tone for controlling the gain of said amplifying means to cancel any tone component from said difference signal, means for changing the level of said difference signal, and means for adding the changed-level difference signal to said generated tone.

8. A test system in accordance with claim 5 wherein the operating means in at least one of said remote and local processors includes means for amplifying at least one of said signal received at the respective input and said generated tone, means for subtracting the amplified one of the signal received at the respective input and said generated tone from the other to derive a difference signal, means responsive to both said difference signal and said generated tone for controlling the gain of said amplifying means to reduce the level of the tone component relative to the level of the disturbance component in said difference signal, means for changing the level of said difference signal, and means for adding the changed-level difference signal to at least one of the signal received at the respective input and said generated tone.

9. A test system for testing the characteristics of a communication channel of interest comprising a test tone generator connected to one end of said channel; a remote processor having an input connected to the other end of said channel, and an output; a test instrument; a local processor having an output connected to said test instrument, and an input; and another channel connected between said remote processor output and said local processor input; said local processor including tracking filter means for operating on the signal received at the respective input to derive a signal proportional thereto but with the tone component absent, means for attenuating and inverting said derived signal, and means for adding together and applying to the respective output the attenuated and inverted derived signal and said signal received at the respective input; said remote processor including tracking filter means for operating on the signal received at the respective input to derive a signal proportional thereto but with the tone component absent, means for amplifying said derived signal, and means for adding together and applying to the respective output the amplified derived signal and said signal received at the respective input.

10. A test system for testing the characteristics of a communication channel of interest comprising a test tone generator connected to one end of said channel; a remote processor having an input connected to the other end of said channel, and an output; a test instrument; a local processor having an output connected to said test instrument, and an input; and another channel connected between said remote processor output and said local processor input; each of said remote and local processors including means for operating on the signal received at the respective input, said received signal having tone and disturbance components therein, to derive a signal proportional thereto but with a tone level changed relative to the disturbance level, and means for applying to the respective output the derived signal, said operating means in the remote processor serving to reduce the tone level relative to the disturbance level and said operating means in the local processor serving to increase the tone level relative to the disturbance level.

11. A test system in accordance with claim 10 wherein the operating means in the remote processor reduces the tone level relative to the disturbance level by a factor equal to that by which the operating means in the local processor increases the tone level relative to the disturbance level.

12. A method for processing a signal consisting of test tone and disturbance components received on a channel and for applying the processed signal consisting of tone and disturbance components to a test instrument comprising the steps of generating a tone whose frequency and phase are the same as those of the received test tone, and operating on the received signal and the generated tone for deriving said processed signal in which the ratio of the level of the disturbance component to the level of the tone component is less by a predetermined factor than the ratio of the level of the disturbance component to the level of the test tone component in the received signal, and the relative phases of the tone and disturbance components are the same as those in the received signal.

13. A method for processing a signal consisting of test tone and disturbance components received on a channel and for applying the processed signal consisting of tone and disturbance components to a test instrument comprising the steps of operating on the received signal to derive a signal proportional thereto but with the tone component level reduced relative to the disturbance component level, attenuating said derived signal, and adding to the attenuated derived signal a tone having the same frequency and phase as those of the test tone contained in said received signal for application to said test instrument.

14. A method for testing the characteristics of a communication channel of interest comprising the steps of transmitting a test tone from one end of said channel to the other; performing a first processing of the received signal at said other end; transmitting the first processed signal over another channel to a test site; and performing a second processing of the received signal at said test site; said first processing step including the sub-steps of generating a tone whose frequency and phase are the same as those of the respective received test tone, and operating on the respective received test tone/disturbance signal and the generated tone for deriving and applying to said other channel a signal in which the ratio of the level of the disturbance component to the level of the tone component is greater by a first factor than the ratio of the level of the disturbance component to the level of the test tone component in the respective received signal, and the relative phases of the tone and disturbance components are the same as those in the respective received signal; said second processing step including the sub-steps of generating a tone whose frequency and phase are the same as those of the respective received test tone, and operating on the respective received test tone/disturbance signal and the generated tone for deriving a signal in which the ratio of the level of the disturbance component to the level of the tone component is less by a second factor than the ratio of the level of the disturbance component to the level of the test tone component in the respective received signal, and the relative phases of the tone and disturbance components are the same as those in the respective received signal.

15. A method in accordance with claim 14 wherein said first and second factors are equal.

16. A method for testing the characteristics of a communication channel of interest comprising the steps of transmitting a test tone from one end of said channel to the other; performing a first processing of the received signal at said other end; transmitting the first-processed signal over another channel to a test site; and performing a second processing of the received signal at said test site; said first processing step including operating on the respective received signal to derive a signal proportional thereto but with the tone component level reduced by a first factor relative to the disturbance component level; said second processing step including operating on the respective received signal to derive a signal proportional thereto but with the tone component level increased by a second factor relative to the disturbance component level.

17. A method in accordance with claim 16 wherein said first and second factors are equal.

18. A method for processing a received signal consisting of test tone and disturbance components and applying the processed signal to a test instrument comprising the steps of operating on the received signal to derive a signal proportional thereto but with the tone component level increased relative to the disturbance component level by a predetermined factor, and applying the derived signal to said test instrument.

19. Apparatus for processing a received signal consisting of test tone and enhanced disturbance components for application of the processed signal consisting of tone and disturbance components to a test instrument comprising means for determining the frequency and phase of the test tone in the received signal, and means responsive to said determining means for operating on the received signal to derive said processed signal in which the ratio of the level of the disturbance component to the level of the tone component is less by a factor than the ratio of the level of the disturbance component to the level of the test tone component in the received signal, and the relative phases of the tone and disturbance components are the same as those in the received signal.

20. A test system for testing the characteristics of a communication channel of interest comprising a test tone generator connected to one end of said channel; a remote processor having an input connected to the other end of said channel, and an output; a test instrument; a local processor having an output connected to said test instrument, and an input; and another channel connected between said remote processor output and said local processor input; each of said remote and local processors including means for determining the frequency and phase of the test tone received at the respective input, and means responsive to said determining means for operating on the test tone/disturbance signal received at the respective input to derive and apply to the respective output a signal in which the ratio of the level of the disturbance component to the level of the tone component is changed by a respective predetermined factor from the ratio of the level of the disturbance component to the level of the test tone component in the signal received at the respective input, and the relative phases of the tone and disturbance components are the same as those in the respective received signal; one of said respective predetermined factors being the inverse of the other.

* * * * *